United States Patent [19]

Parma

[11] Patent Number: 4,583,397

[45] Date of Patent: Apr. 22, 1986

[54] METHOD OF GEOPHYSICAL EXPLORATION IN A WELL BOREHOLE

[75] Inventor: Richard E. Parma, Houston, Tex.

[73] Assignee: Amoco Corporation, Chicago, Ill.

[21] Appl. No.: 741,773

[22] Filed: Jun. 6, 1985

[51] Int. Cl.⁴ .............................................. E21B 49/00
[52] U.S. Cl. ..................................................... 73/152
[58] Field of Search ........................... 73/152; 364/421

[56] References Cited

U.S. PATENT DOCUMENTS

| | | | |
|---|---|---|---|
| 2,408,012 | 9/1946 | Williams | 73/152 |
| 4,399,693 | 8/1983 | Gournay | 73/152 |
| 4,449,208 | 5/1984 | Moeckel et al. | 367/30 |
| 4,457,168 | 7/1984 | Lautzenhiser et al. | 73/151 |
| 4,464,930 | 8/1984 | Givens | 73/152 |
| 4,467,642 | 8/1984 | Givens | 73/152 |
| 4,475,038 | 10/1984 | Lochmann et al. | 250/270 |
| 4,492,864 | 1/1985 | Smith, Jr. et al. | 250/259 |

*Primary Examiner*—Jerry W. Myracle
*Assistant Examiner*—Robert R. Raevis
*Attorney, Agent, or Firm*—Timothy D. Stanley

[57] ABSTRACT

The present invention is directed to a method of geophysical exploration more particularly, a novel method for locating hydrocarbon-containing formations in a well borehole is provided. The method of the present invention is particularly adapted to providing indicia of hydrocarbon-containing formations for evaluating formations surrounding a cased well borehole for overlooked hydrocarbon-containing formations.

16 Claims, 21 Drawing Figures

METHOD OF GEOPHYSICAL EXPLORATION IN A WELL BOREHOLE

BACKGROUND OF THE INVENTION

The field of the present invention relates generally to improved methods of geophysical exploration. More particularly, the present invention relates to a novel method for locating hydrocarbon-containing formations surrounding a well borehole, especially in previously producing wells. The present invention also provides a method for determining changes in deposition, compaction and porosity for selected formation lithologies surrounding a well borehole.

The desirability of increasing production from previously producing wells has long been recognized. Substantial efforts have been directed in this area to increasing production from previously producing formations such as Gournay, U.S. Pat. No. 4,399,693. However, it is oftentimes desirable to reevaluate other formations surrounding the well borehole which have not previously been brought into production for the possibility of overlooked hydrocarbon-containing formations.

Present well logging techniques are somewhat restricted in their ability to reevaluate such overlooked formations surrounding the well borehole because of limitations generally associated with such well logging techniques when employed in cased well boreholes. Specifically, the steel casing can act as a barrier to or impose severe limitations on the capability of most well logging techniques to reevaluate formations surrounding the cased well borehole. Moreover, most well logging techniques used within a cased well borehole have an exploration range limited to a few inches into the surrounding formations beyond the casing, e.g., gamma-gamma ray, neutron, sonic, electric log, etc.

Accordingly, there remains a need in the exploration field for an accurate method for determining the location of hydrocarbon-containing formations overlooked during initial production. Additionally, a need exists for a method of locating overlooked hydrocarbon-containing formations surrounding a well borehole, at a reasonable cost without having to pull the casing from the well borehole having sufficient exploration range and evaluation capabilities. Moreover, a need exists to provide indicia of hydrocarbon-containing formations surrounding the cased well borehole.

SUMMARY OF THE INVENTION

The present invention relates generally to an improved method of geophysical exploration. More particularly, the invention relates to a method for locating hydrocarbon-containing formations, surrounding a well borehole, especially in previously producing wells. The present invention provides a method for locating hydrocarbon-containing formations in both cased and uncased well boreholes, as well as providing indicia of hydrocarbon-containing formations from changes in compaction, deposition, and porosity of the formation lithologies surrounding the well borehole.

The improved method of locating hydrocarbon-containing formations includes obtaining a first signal representative of formation lithology surrounding a well borehole at spaced intervals along the length of the well borehole. A second signal representative of formation bulk density surrounding the well borehole is obtained at spaced intervals along the length of the well borehole. By plotting the formation bulk density surrounding the well borehole along the length of the well borehole as a function of formation lithology, one is able to ascertain the locations of hydrocarbon-containing formations surrounding a well borehole from selected indicia of hydrocarbon-containing formations such as changes in deposition, compaction, and porosity within a selected formation lithology.

BRIEF DESCRIPTION OF THE DRAWINGS

This invention will be better understood if reference is made to the accompanying drawings in which:

FIG. 5C is a lithological-density plot of the well borehole of interest for an East Texas salt basin carbonate-shale deposition.

DESCRIPTION OF THE PREFERRED EMBODIMENT

The present invention relates generally to a method of geophysical exploration. More particularly, the present invention is directed to a novel method of locating hydrocarbon-containing formations surrounding a well borehole, especially in previously producing wells. Indicia of hydrocarbon-containing formations such as changes in deposition, compaction and porosity of selected formation lithologies surrounding the well borehole are also obtained. Changes in formation bulk density as a function of depth for a selected formation lithology, e.g., shale, carbonate, sandstone, etc. can provide a well log analyst with interpretive information regarding the deposition, compaction and porosity of the selected formation lithology and provide indicia for locating hydrocarbon-containing formations.

The development of the borehole gravimeter has now progressed to the point where borehole gravimeters of the type disclosed by Lautzenhiser, et al., U.S. Pat. No. 4,457,168 are regularly employed to obtain a measure of formation bulk density and formation porosity within a broad radius around the well borehole. Moreover, others such as Gournay, U.S. Pat. No. 4,399,693, have developed methods of employing the gravimeter to determine residual oil remaining in a producing formation. However, the need to reevaluate nonproducing, overlooked formations surrounding a well borehole, especially in cased well boreholes, has gone unfulfilled largely because the steel casing can act as a barrier to reevaluate such formations surrounding the well borehole.

Figure 1:
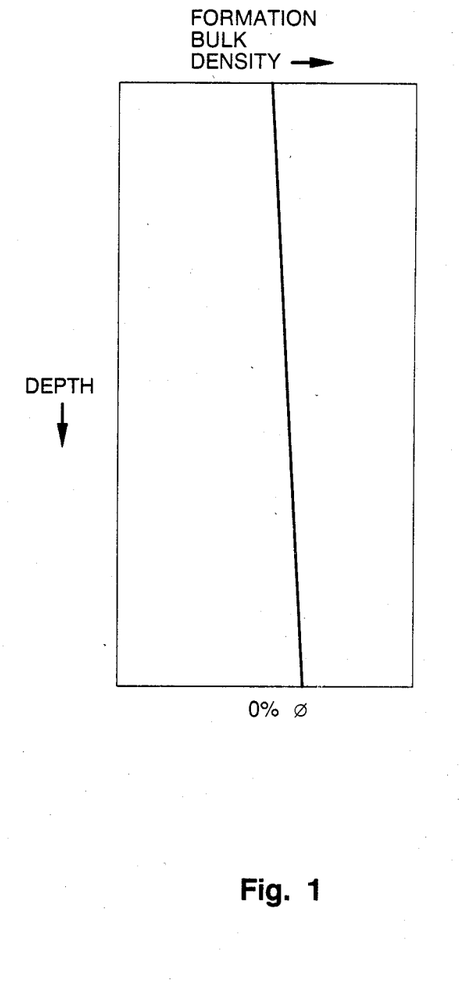
FIG. 1 depicts the variation of formation density with increasing depth.

As an aid in understanding the present invention, the following discussion is provided. Looking first to FIG. 1, a representation of the estimated variation of sandstone formation bulk density as a function of depth for 0% ($\Phi$) porosity is shown. FIG. 1 indicates that as the formation overburden increases the formation becomes more dense. However, the sandstone formation bulk density varies not only as a function of depth and porosity, but also as a function of the fluid density in the pore spaces of the formation.

Figure 2:
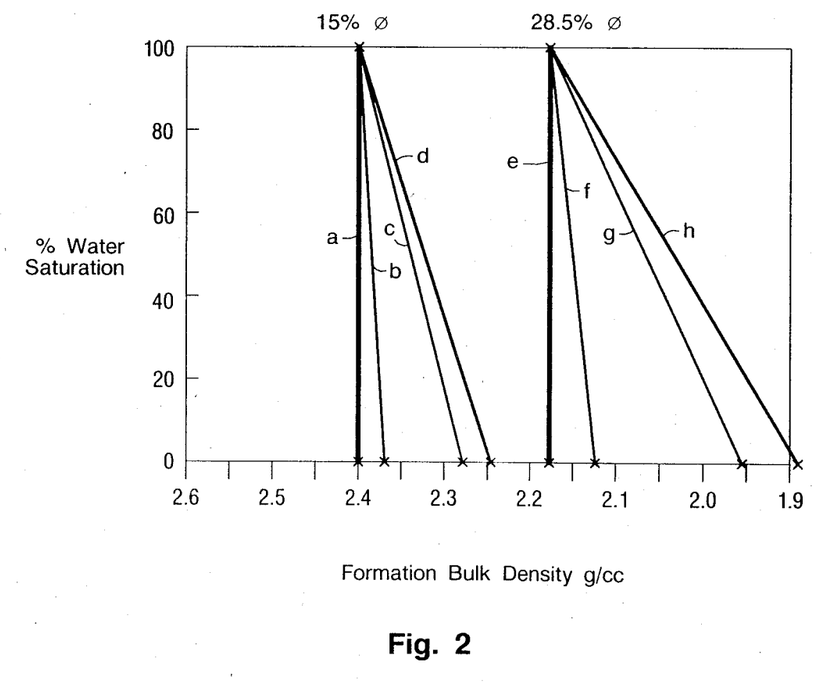
FIG. 2 depicts the change in formation bulk density with increasing depth as a function of varying water saturation and porosity, as well as varying oil and gas density.

Now looking to FIG. 2, a representation of the estimated variation of the sandstone formation bulk density for two separate porosities, i.e., 15% ($\Phi$) and 28.5% ($\Phi$), as a function of water saturation and varying oil and gas densities are shown. Curves similar to those shown in FIGS. 1 and 2 can easily be obtained for multiple variations of the parameters. Specifically, curve "a" in FIG. 2 represents the variation in formation bulk density of a sandstone formation having 15% porosity and an oil-water mixture varying from 0 to 100% wherein the density of the oil and water are both approximately 1 gm/cc. Next looking to curve "b" in FIG. 2, the same sandstone formation having a porosity of 15% is shown wherein the variation in formation bulk density as a function of oil-water saturation wherein the oil has a density of 0.8 gm/cc. Curve "c" represents the same sandstone formation having 15% porosity, however, containing a gas-water mixture wherein the gas has a density of 0.2 gm/cc. Curve "d" represents the same sandstone formation having 15% porosity and a gas water mixture wherein the gas has an approximate density of 0 gm/cc, i.e., a dry gas.

Similarly, looking to curves "e", "f", "g" and "h", the same sandstone formation however, having a porosity of 28.5%, is shown with the same variations in water-oil and water-gas saturations and variations in the oil and gas densities are shown. The most significant observations from FIG. 2 are that changes in water-gas saturation have a much more pronounced effect on formation bulk density than changes in oil-water saturation and that changes in porosity can dramatically vary formation bulk density. These observations can provide indicia for locating hydrocarbon-containing formations such as changes in compaction, deposition and porosity of a selected formation lithology surrounding the well borehole.

Presently, several well logging techniques have been developed to determine formation lithology surrounding a well borehole. Such logging techniques develop an electrical signal at spaced intervals along the length of the well borehole representative of formation lithology. Examples of such techniques are Lochmann, et al., U.S. Pat. No. 4,475,038 and Moeckel, et al., U.S. Pat. No. 4,449,208.

Generally, electric logs (SP, resistivity), nuclear logs (gamma, neutron) and sonic logs can be employed to provide an indication of formation lithology surrounding a well borehole. Several of these techniques, however, are severely limited in a steel cased borehole such that additional techniques such as Smith et al., U.S. Pat. No. 4,492,864, have been developed.

Since the borehole gravimeter detection capability is not substantially affected by the presence of well borehole casing, it is especially ideal for reevaluating nonproducing formations in a producing, cased well borehole. The present invention describes a novel application of formation bulk density as determined by a borehole gravimeter to geophysical exploration in combination with well logging techniques for determining formation lithology surrounding the well borehole. Most advantageously, the present invention describes a novel method for reevaluating nonproducing formations in a producing well having a cased well borehole.

As known to those skilled in the art, a well log can be obtained which provides a record of one or more physical measurements as a function of depth in a borehole. Examples of such logs are electrical logs (SP, resistivity, etc.), sonic logs (sonic, VSP, etc.), nuclear logs (gamma-gamma ray log, neutron logs) and other measurements can be employed to obtain a lithological log, i.e., a log showing lithology as a function of depth in a borehole. For the purposes of the present invention, all such techniques are considered equivalent and will hereafter be referred to as lithological logs.

Figure 3A:
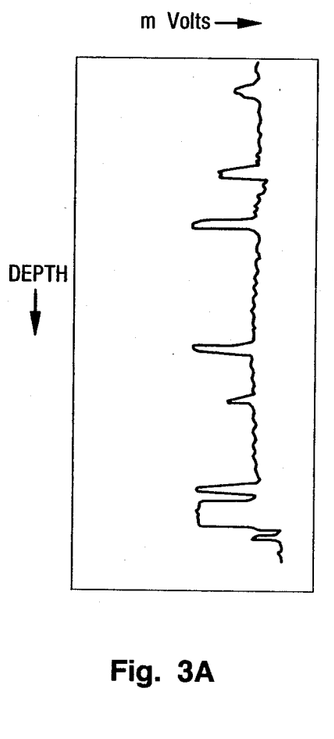
FIG. 3A is a representation of an electric log (self potential) for a well borehole of interest.
Figure 3B:
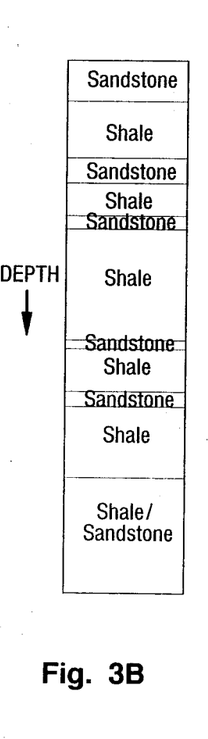
FIG. 3B is a representation of a lithological log of the well borehole of interest derived from FIG. 3A.

Now looking to FIG. 3A, a representation of an electrical log (SP) signal is shown. Generally, lithological logs are run after the completion of the well, but prior to casing the well borehole. However, whether or not the lithological log is obtained prior to or subsequent to the casing of the well borehole, a lithological log as shown in FIG. 3B can be obtained from FIG. 3A by those skilled in the art of well log interpretation. In this particular instance, a sandstone formation has been distinguished from a shale formation. Although as shall be shown later, the present invention is not limited to sandstone and shale formations. In particular, the formations represented in FIG. 3 are from a Gulf Coast Miocene-Frio sand-shale deposition.

A borehole gravimeter signal is obtained at spaced intervals along the length of the well borehole and a measurement of the vertical component of gravity is obtained. Changes in the vertical component of gravity at spaced intervals along the well borehole can be used to obtain a measure of formation bulk density according to $$\rho_b = \frac{F - (\Delta g/\Delta z)}{4\pi G} \qquad (1)$$

where

F=free air gradient
Δg=difference in gravity between two measurements
Δz=vertical distance between location of gravity measurements
G=universal gravitational constant.

The borehole gravimeter should be sensitive enough to accurately reproduce changes in formation bulk density as small as ±0.02 gm/cc. The formation bulk density as a function of depth along the length of the borehole can be plotted as in FIG. 3C. Thereafter, by plotting the formation bulk density along the length of the well borehole as a function of formation lithology, as determined from FIG. 3B, a lithological-density plot for each lithology can be obtained, as shown in FIG. 3D.

A lithological-density trend line can be estimated for both the sandstone and shale lithological-density plots. Such lithological-density trend lines represent an estimate of the variation of formation bulk density as a function of depth for common lithologies and assumes uniform compactions, porosity, and deposition for the selected lithology such as shown in FIGS. 1 and 2. The lithological-density trend line can be established by any curve fitting technique, e.g., least squares, etc., of the estimated variation of formation bulk density as a function of depth for common lithologies and can represent a selected porosity and water-gas or water-oil saturation as seen in FIGS. 1 and 2.

Figure 3C:
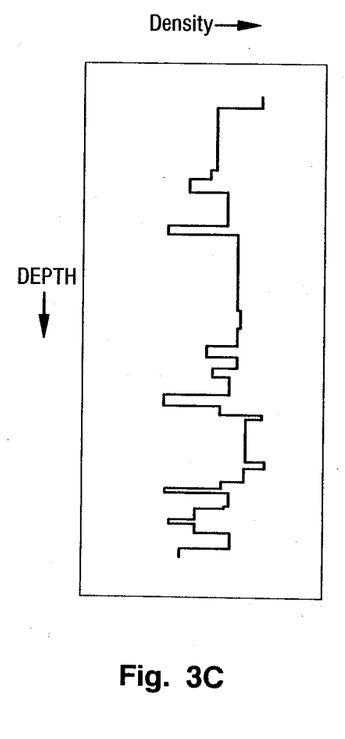
FIG. 3C is a representation of a formation bulk density log of the well borehole of interest obtained from a borehole gravimeter.
Figure 3D:
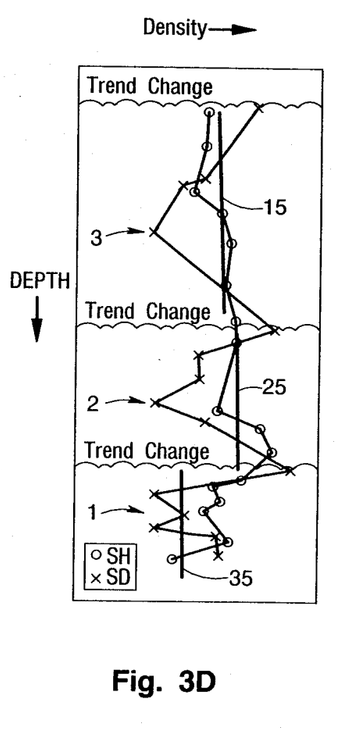
FIG. 3D is a lithological-density plot of the well borehole of interest for a Gulf Coast Miocene-Frio sandstone-shale deposition.

In FIG. 3D lithological-density trend lines 15, 25 and 35 represent the variations of formation bulk density for a water saturated sandstone of a selected porosity for three separate sandstone depositions 1, 2, and 3. Thus, deflections in the sandstone (SD) lithological-density plot (i.e., the line connecting the X's) from the sandstone lithological-density trend lines 15, 25 and 35 are indicative of changes in porosity, compaction and deposition of the selected sandstone lithology as well as pore fluid content. Moreover, as will be discussed below, comparisons of the lithological density plots for sandstones and shale (SH) lithologies can provide further indicia for identifying and locating hydrocarbon-containing formations. When a lithological-density plot departs from the lithological-density trend line, the lithological density plot becomes anomalous and can provide indicia of hydrocarbon-containing formations surrounding the well borehole.

For depth control, the formation bulk density from FIG. 3C corresponding to the center of each lithological interval from FIG. 3B is plotted in FIG. 3D, e.g., a sandstone formation bulk density measured for the interval 6030 ft to 6050 ft would be plotted as the value of the formation bulk density at 6040 ft. It is also desirable that accurate depth control be provided in the lithological log such that for a given depth the lithological information ties to the formation bulk density.

In FIG. 3D, three separate sandstone (SD) depositions (1, 2, and 3) are separated on the sandstone lithological-density plot by a serrated trend change line. Additionally, sandstone lithological-density trend lines 15, 25 and 35 for each sandstone deposition are shown in FIG. 3D. Original production was from the lowest sandstone formation 1. After re-evaluating the formations surrounding the well borehole, sandstone formation 2 was successfully completed as a hydrocarbon-producing formation. Sandstone formation 3 is yet to be completed, although it remains a viable candidate for completion. The anomalous deflections (i.e., lower density sandstones) of the lithological-density plots from the lithological-density trend lines indicates a potential hydrocarbon-containing sandstone formation bounded by an upper and lower tight sandstone, i.e., higher density sandstones that seal off the hydrocarbon-containing formation. Moreover, the shale lithological-density plot would have a corresponding anomalous deflection from its lithological-density trend line (not shown).

The same evaluation criteria can be applied to the shale lithological-density plot as applied to that for the sandstones. Since shale formations are considered source beds for hydrocarbons, the combination of closely spaced anomalous shale and sandstone lithological-density plots can be a positive indicator of potential hydrocarbons. Such indicia of hydrocarbon-containing formations can be utilized to differentiate a gas-containing formation having the same porosity as the lithological-density trend line (yet lower density) from a water-containing formation having a greater porosity than the lithological-density trend line (yet having the same density as the gas-containing formation). To the skilled well log analyst, deflections in the lithological-density plot from the lithological density trend line provide other indicia of hydrocarbon-containing formation such as changes in porosity, compaction and deposition of a given formation lithology. The anomalous deflections in the lithological-density plot from the lithological-density trend line are especially useful in locating gaseous hydrocarbons.

Figure 4A:
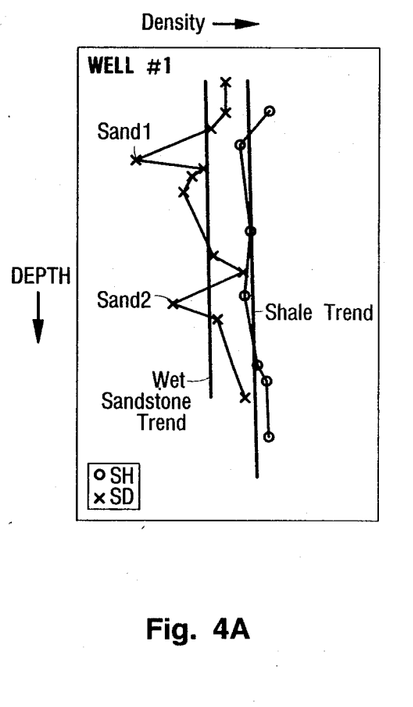
FIGS. 4A, B, and C, are lithological-density plots of multiple wells in the same geographic locale as shown in FIG. 3D.
Figure 4B:
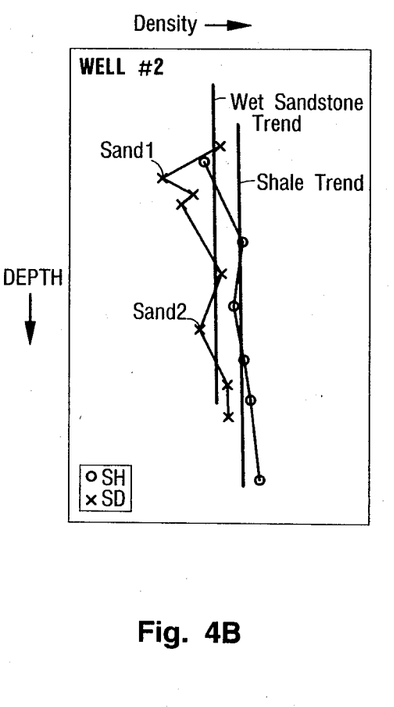
Figure 4C:
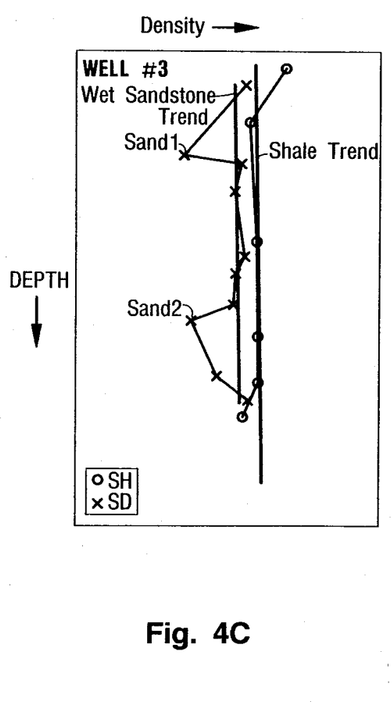

It has been found that the lithological-density plots can provide an accurate and consistent method for tracking and comparing anomalous formations amongst multiple wells in the same geographic locale as shown in FIGS. 4A, B, and C. Here, the anomalous deflection in the sandstone lithological-density plot, indicated Sand 1 and Sand 2, can easily be tracked. Additionally, the differences between the lithological-density plots and lithological-density trend lines can also provide insight into the structural features of the formations. The well depicted in FIG. 4A is near the top of a dome structure as inferred by the larger relative separation between the sandstone and shale lithological-density trend lines. That the wells in FIGS. 4B and 4C are located around the periphery of the dome can be inferred by the smaller relative separation between the sandstone and shale lithological-density trend lines.

Figure 5A:
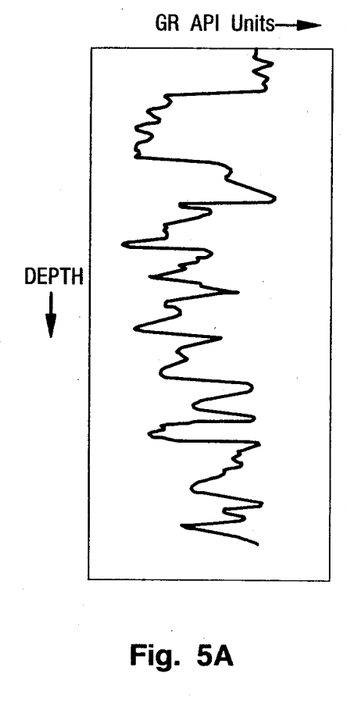
FIG. 5A is a representation of a gamma-gamma ray log for a well borehole of interest.
Figures 5B, 5C:
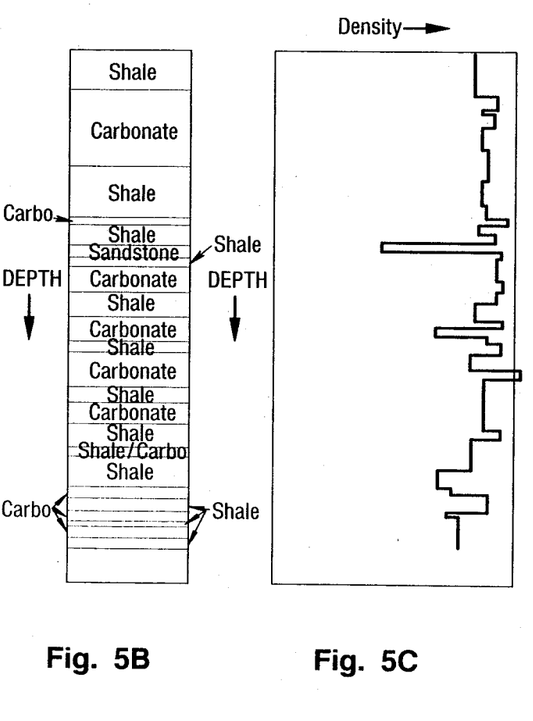
FIG. 5B is a representation of a lithological log of the well borehole of interest derived from FIG. 5A.
FIG. 5C is a representation of formation bulk density log of the well borehole of interest obtained from a borehole gravimeter.
Figure 5D:
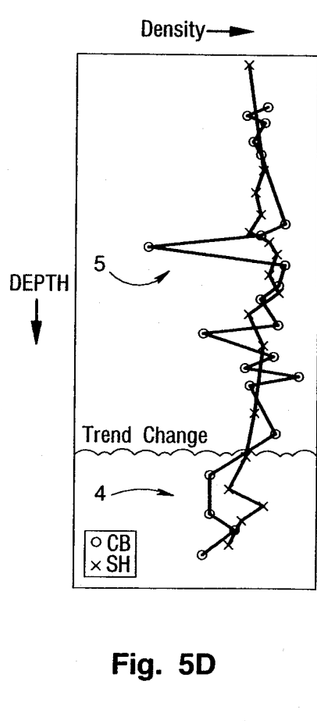

Now looking to FIGS. 5A, B, C and D, an East Texas salt basin carbonate-shale deposition has been evaluated. Looking first to FIG. 5A, a representation of a gamma-gamma ray log is shown. FIG. 5B is a representation of a lithological log derived from FIG. 5A indicating the transition from shales to carbonates. Borehole gravimeter measurements can be obtained and plotted as a measure of formation bulk density along the length of the well borehole for both the carbonate and shale formations in FIG. 5C and separately plotted as lithological-density trend plots in FIG. 5D. Anomalous zones or deflections of the lithological-density plot from the lithological-density trend lines occur in the same way as in the sandstone-shale lithological-density plots of FIG. 3D. In this instance, however, it is noted that the shale (SH) lithological-density plot is very uniform and hence deflections from its lithological-density trend line (not shown) would be small. The lithological log of FIG. 5B as well as the gamma-gamma ray log of FIG. 5A and the formation density log of FIG. 5C indicate that the formations presented are a very complex deposition of alternating layers. Two distinct carbonate (CB) depositions 4 and 5 are shown in FIG. 5D as separated by the serrated trend change line. As a note, the depth scale of FIG. 5 is much greater than that of FIG. 3, such that the resolution between adjacent formations appears much more distinct in FIG. 3 than in FIG. 5. Traditionally, carbonate-shale lithologies in East Texas present borehole drilling problems that result in large washed out boreholes, i.e., rugose conditions. These conditions generally create low quality conventional well logs even today. Rugose conditions do not, however, adversely affect the quality of the borehole gravimeter data or the capabilities of the present invention to provide indicia of hydrocarbon-containing formations.

Figure 6A:
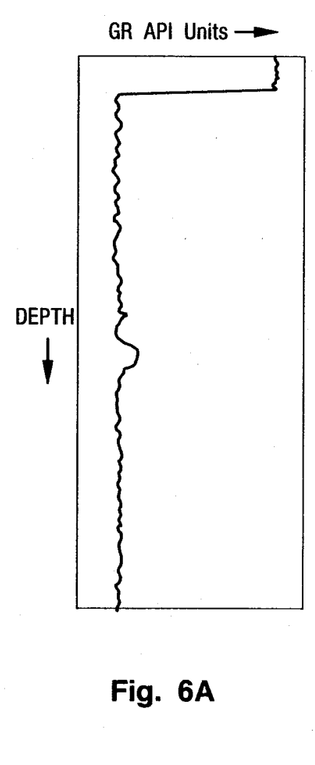
FIG. 6A is a representation of a gamma-gamma ray log for a well borehole of interest.
Figure 6B:
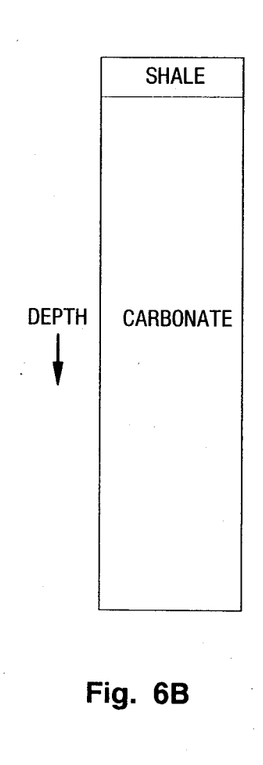
FIG. 6B is a representation of a lithological log of the well borehole of interest derived from FIG. 6A.
Figure 6C:
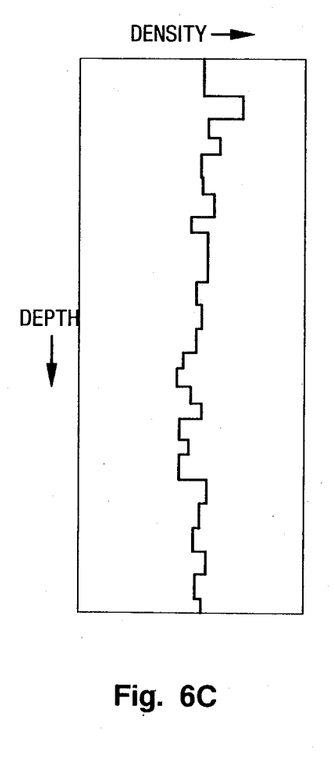
FIG. 6C is a representation of a formation bulk density log of the well borehole of interest obtained from a borehole gravimeter.
Figure 6D:
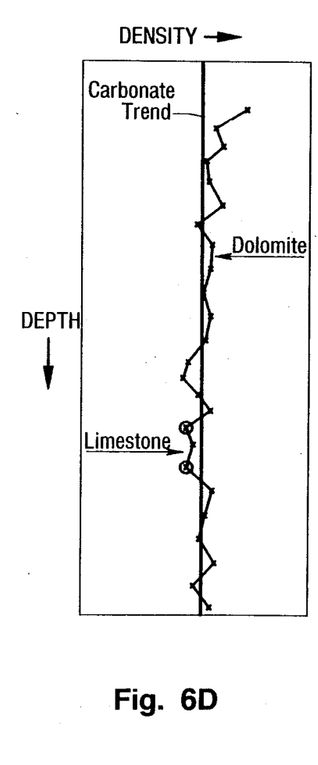
FIG. 6D is a lithological-density plot of the well borehole of interest for a Michigan basin carbonate deposition.

Next looking to FIGS. 6A, B, C and D, a Michigan basin carbonate deposition is shown. First in FIG. 6A, a representation of a gamma-gamma ray log is shown. Since the area of interest is the carbonate formation, the lithological log 6B indicates that a substantial portion of the well borehole of interest is, a carbonate lithology. FIG. 6C is a borehole gravimeter signal plotted as formation bulk density. Whereas, FIG. 6D plots the carbonate formation bulk density as a function of depth and superimposed thereon is the estimated lithological-density trend line for such carbonate disposition. In tight homogeneous carbonates that have fracture porosity, minute density changes are difficult to display with conventional well logs. However, the present display, as shown in FIG. 6D, displays minute changes better than conventional or borehole gravimeter logs. Using a lithological-density trend line for a limestone matrix, FIG. 6D clearly displays rock property changes of the carbonate from dolomite to limestone. Since dolomite is a higher density material and as it increases, the borehole gravimeter density will depart from that of limestone. Such indices can provide valuable information to evaluate for potential hydrocarbon-containing formations. Moreover, it can be seen that FIG. 6D also clearly defines the limestone/dolomite boundary, whereas with gamma ray log measurements of the radioactive minerals contained therein, presents a distorted picture.

Figure 7A:
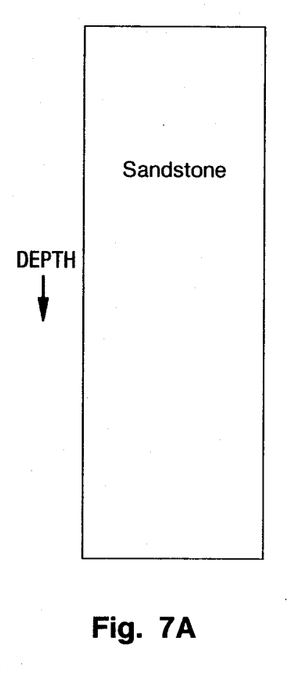
FIG. 7A is a representation of a lithological log for a well borehole of interest.
Figure 7B:
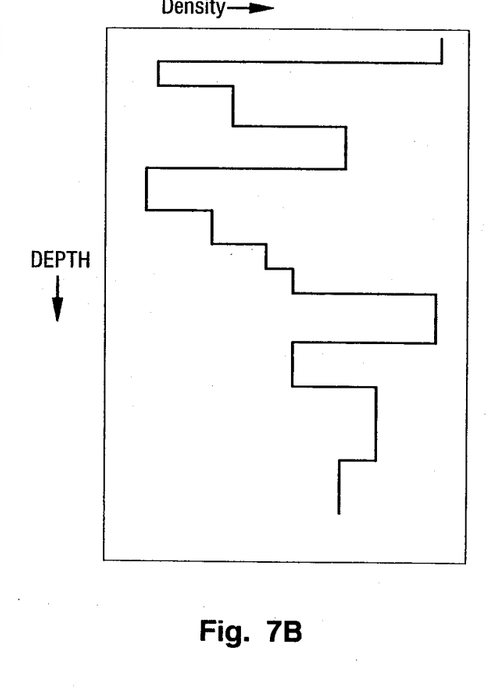
FIG. 7B is a representation of a formation bulk density log of the well borehole of interest obtained from a borehole gravimeter.
Figure 7C:
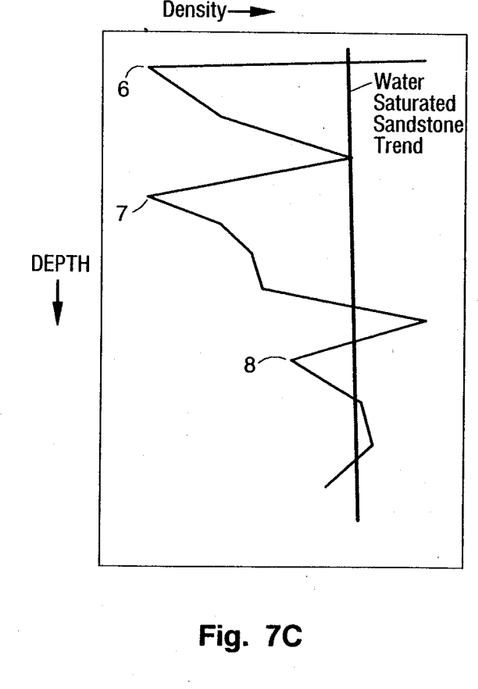
FIG. 7C is a lithological-density plot of the well borehole of interest for a New Mexico sandstone deposition.

FIGS. 7A, B and C represent a New Mexico sandstone deposition. First, in FIG. 7A a representation of a lithological log is shown. Since the portion of the length of the well borehole of interest is substantially all sandstone, a representation of the gamma-gamma ray log is not provided, although it would be similar in appearance to that of FIG. 6A. The formation bulk density log of FIG. 7B and the lithological-density plot of FIG. 7C reveal three separate sandstone formations 6, 7, and 8 separated by tight sandstone beds, i.e., higher density sandstone. Moreover, the stairstep appearance of the formation bulk density log 7B and the lithological-density plot 7C correlate well with the accepted theory that gaseous hydrocarbons tend to diffusion upwardly within a formation to the extent permitted by the porosity of the formation. It is noted in FIG. 7 that an interval of only approximately 200 ft is covered in contrast to an interval of approximately 1,000 ft in FIG. 3.

Figure 8:
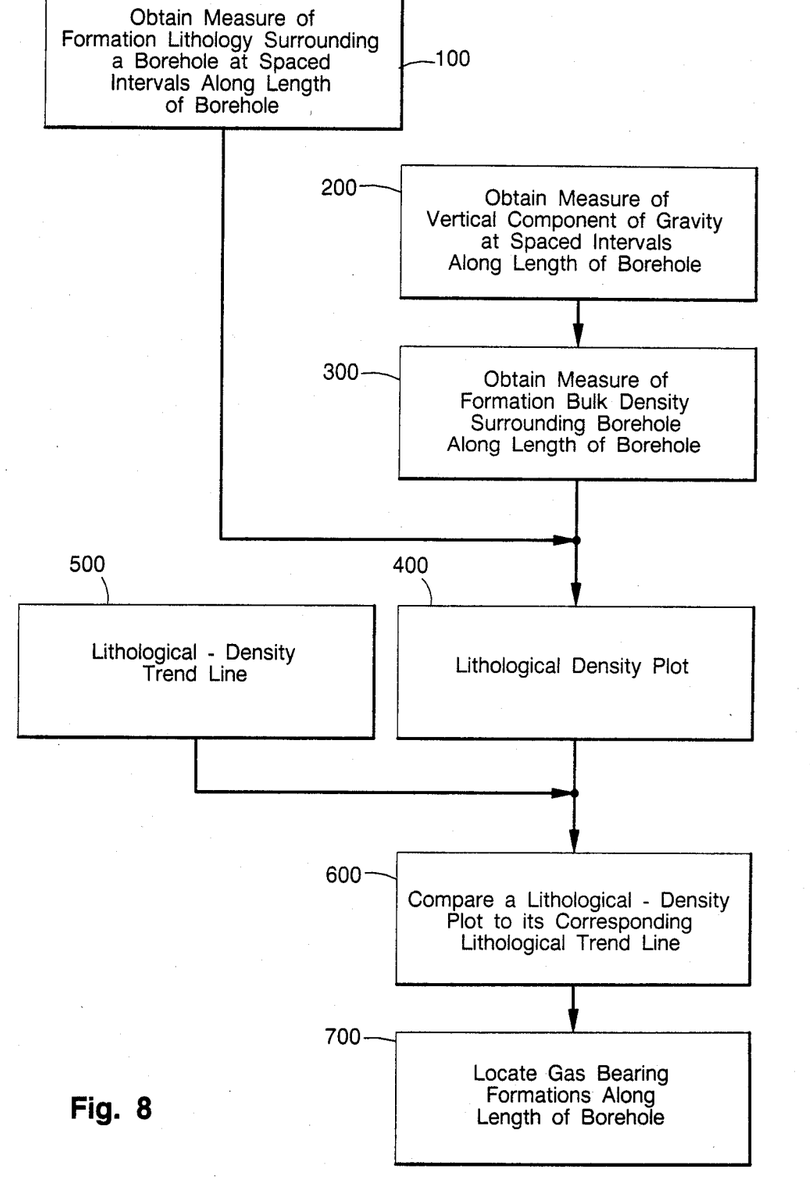
FIG. 8 shows a process flow chart of the present invention.

Now looking to FIG. 8, a process flow diagram of the present invention is shown. As indicated, a measure of formation lithology surrounding the well borehole is obtained at spaced intervals along the length of the borehole at 100. Such measure of formation lithology can be obtained using conventional techniques such as electric log, nuclear log, sonic log, etc., either prior to or subsequent to casing of the well borehole. Next at 200, a measure of the vertical component of gravity is obtained at spaced intervals along the length of the well borehole with a borehole gravimeter. A measure of formation bulk density surrounding the length of the well borehole is obtained at 300 from the measure of vertical component of gravity from 200. The formation bulk density is plotted as a lithological-density plot at 400. Optionally and as an aid to assist the well log analyst, a lithological-density trend line of the estimated variation of formation bulk density along the length of the well borehole can be curve fitted to the lithological-density plot at 500. By comparing a lithological-density plot to its associated lithological-density trend line at 600, one is able to ascertain anomalous deflections from the lithological-density trend plot to obtain indicia of hydrocarbon-containing formations and thereby locate hydrocarbon-containing formations surrounding the well borehole at 700.

Whereas, the present invention has been described in particular relation to the selected lithologies in relation to selected lithologies and specific methods of determining formation lithology and formation bulk density, it should be understood that other techniques and modifications thereto, apart from those shown or suggested here, may be made within the scope and spirit of the present invention.

I claim:

1. A method of geophysical exploration in a well borehole comprising the steps of:
    (a) obtaining a first signal representative of formation lithology surrounding the well borehole at spaced intervals along a selected length of the well borehole;
    (b) obtaining a second signal representative of formation bulk density surrounding the well borehole at spaced intervals along the selected length of the well borehole; and
    (c) plotting formation bulk density along the selected length of the well borehole as a function of formation lithology surrounding the well borehole.

2. The method of claim 1 further including the step of obtaining indicia of hydrocarbon-containing formation from the plot of formation bulk density along the selected length of the well borehole as a function of formation lithology surrounding the well borehole.

3. The method of claim 1 further including the step of forming an estimated lithological-density trend line to a selected lithology plot of formation bulk density by curve fitting the plot of formation bulk density along the selected length of the well borehole for the selected lithology.

4. The method of claim 3 further including the step of obtaining indicia of a hydrocarbon-containing formation from anomalous deflections in the plot of the selected lithology formation bulk density from its associated lithological-density trend line.

5. The method of claim 1 wherein step (c) includes:
    (a) plotting formation bulk density along the selected length of the well borehole as a function of lithology for a first lithology;
    (b) plotting formation bulk density along the selected length of the well borehole for a second lithology; and
    (c) comparing the plots of formation bulk density along the selected length of the well borehole for the first and second lithologies to obtain indicia of hydrocarbon-containing formations.

6. A method of geophysical exploration in a well borehole comprising the steps of:

(a) obtaining a measure of lithology along a selected length of the well borehole representative of formations surrounding the well borehole;

(b) obtaining a measure of formation bulk density surrounding the well borehole at spaced intervals along the selected length of the well borehole; and (c) obtaining a measure of formation bulk density along the selected length of the well borehole as a function of formation lithology surrounding the well borehole.

7. The method of claim 6 further including the step of obtaining indicia of hydrocarbon-containing formation from the measure of formation bulk density along the selected length of the well borehole as a function of formation lithology surrounding the well borehole.

8. The method of claim 6 further including the steps of:

(a) obtaining a measure of formation bulk density along the selected length of the well borehole for a first lithology;

(b) obtaining a measure of formation bulk density along the selected length of the borehole for a second lithology; and (c) comparing (a) and (b) for locating hydrocarbon-containing formations.

9. The method of claim 8 further including the steps of:

(a) estimating a lithological-density trend of formation bulk density for each lithology; and (b) comparing the measure of formation bulk density along the selected length of the well borehole for a selected lithology with its corresponding estimated lithological-density trend of formation bulk density for locating hydrocarbon-containing formations.

10. A method of geophysical exploration for overlooked hydrocarbon-containing formations surrounding a cased well borehole comprising the steps of:

(a) obtaining a measure of formation bulk density surrounding the cased well borehole along a selected length of the well borehole for at least one lithology;

(b) estimating a lithological-density trend of formation bulk density for each lithology along the selected length of the well borehole; and (c) comparing (a) and (b) for each lithology for indicia of overlooked hydrocarbon-containing formations surrounding the cased well borehole.

11. The method of claim 10 further including the step of comparing the measures of formation bulk density surrounding the cased wellbore along the selected length of the well borehole for at least two lithologies for indicia of overlooked hydrocarbon-containing formations surrounding the cased well borehole.

12. The method of claim 10 wherein the indicia of overlooked hydrocarbon-containing formation includes changes in porosity, compaction and deposition for each lithology along the selected length of the well borehole.

13. A method of claim 10 wherein step (a) comprises:

(a) obtaining a lithological log representative of formation lithology surrounding the cased well borehole for the selected length of the well borehole;

(b) obtaining a log representative of formation bulk density surrounding the cased well borehole at spaced intervals along the selected length of the cased well borehole; and (c) obtaining a measure of formation bulk density along the selected length of the cased well borehole as function of formation lithology surrounding the cased well borehole.

14. A method for displaying geophysical information to provide indicia of hydrocarbon-containing formations surrounding a well borehole comprising the steps of:

(a) plotting formation bulk density along a selected length of the well borehole as a function of lithology;

(b) forming an estimated lithological-density trend line to a selected lithology plot of formation bulk density by curve fitting the plot of formation bulk density along the selected length of the well borehole for the selected lithology; and (c) obtaining indicia of hydrocarbon-containing formations from anomalous deflections in the plot of the selected lithology formation bulk density from its associated lithological-density trend line.

15. The method of claim 14 further including the steps of:

(a) plotting formation bulk density along the selected length of the well borehole as a function of at least two selected lithologies; and (b) comparing the plots of formation bulk density along the selected length of the wellbore for the selected lithologies to obtain indicia of hydrocarbon-containing formations.

16. A display of geophysical information as produced by claim 14 or 15.

* * * * *